Figure 1:
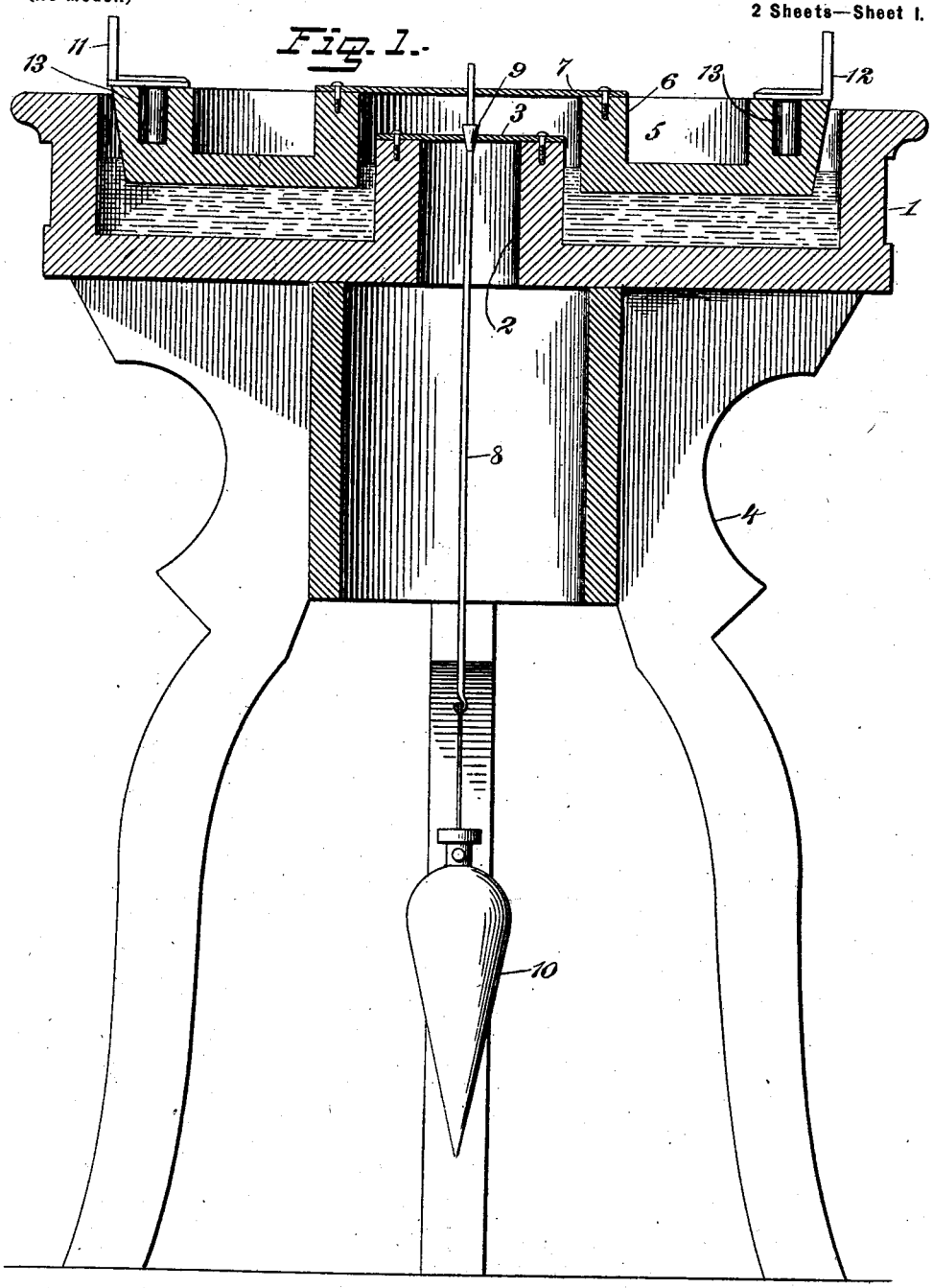

No. 701,612. Patented June 3, 1902.
G. H. PRIER.
LEVELING INSTRUMENT.
(Application filed Feb. 28, 1902.)
(No Model.) 2 Sheets—Sheet 2.
Fig. 2.
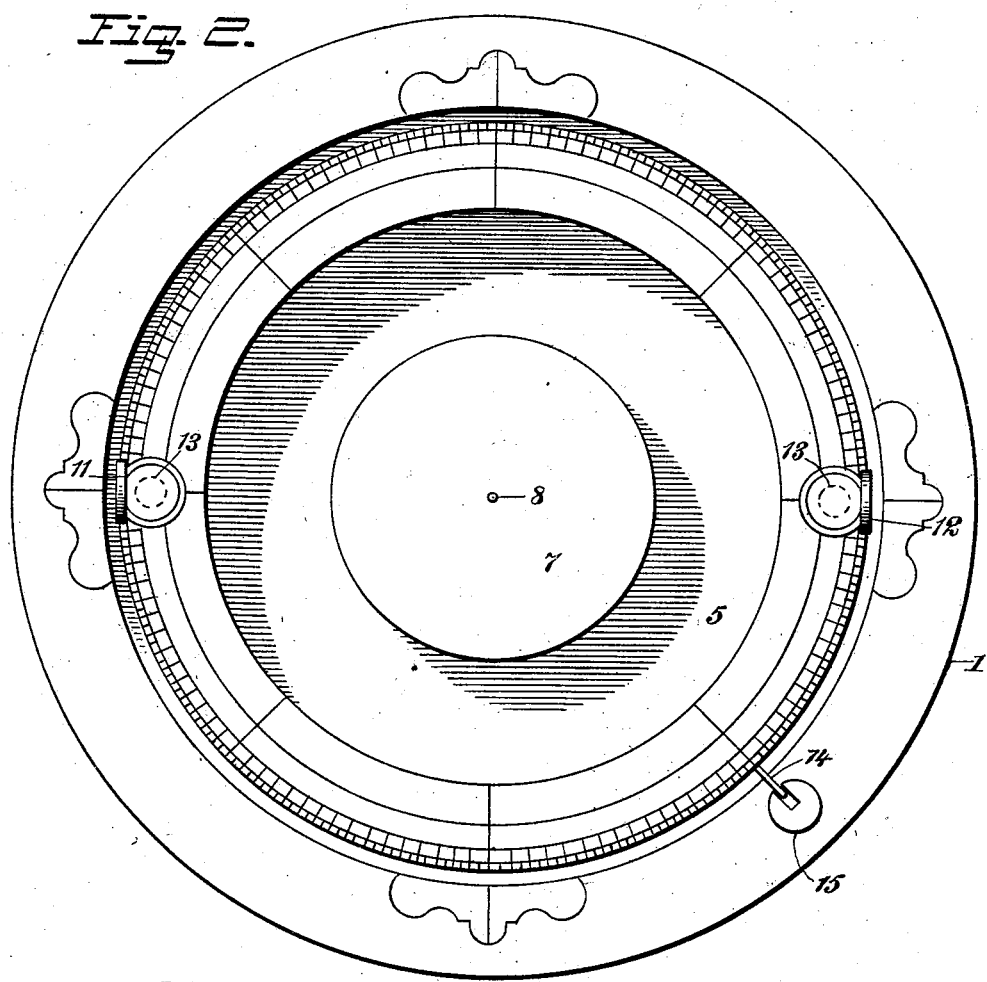
Fig. 3.
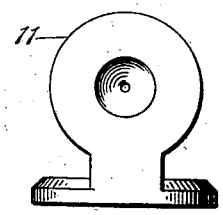
Fig. 4.
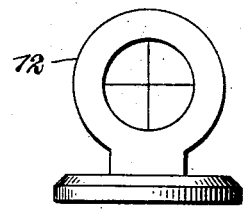
WITNESSES:
INVENTOR
George H. Prier
BY
ATTORNEYS

UNITED STATES PATENT OFFICE.

GEORGE H. PRIER, OF NEW YORK, N. Y.

LEVELING INSTRUMENT.

SPECIFICATION forming part of Letters Patent No. 701,612, dated June 3, 1902.

Application filed February 28, 1902. Serial No. 96,078. (No model.)

*To all whom it may concern:*

Be it known that I, GEORGE H. PRIER, a citizen of the United States, and a resident of the city of New York, (Port Richmond, borough of Richmond,) in the county of Richmond and State of New York, have invented a new and Improved Leveling Instrument, of which the following is a full, clear, and exact description.

This invention relates to improvements in level-finding instruments; and the object is to provide an instrument of this character that shall be so simple in construction that any person skilled or unskilled may readily understand and operate to find level lines in any direction, the device being particularly adapted for the use of builders, contractors, carpenters, plumbers, and, in fact, in all occupations where level lines are to be formed, the instrument practically taking the place in some instances of the intricate and expensive surveying-transit or of straight-edges and spirit-levels.

I will describe a leveling instrument embodying my invention and then point out the novel features in the appended claims.

Reference is to be had to the accompanying drawings, forming a part of this specification, in which similar characters of reference indicate corresponding parts in all the figures.

Figure 1 is a transverse section of a leveling instrument embodying my invention. Fig. 2 is a plan view thereof, and Figs. 3 and 4 show sights that may be employed.

The instrument comprises a trough 1, which, as here shown, is circular and provided with a hollow upwardly-extended central portion 2, on the top of which is secured a metal plate 3. This trough may be made of any suitable material that will hold water or other liquid. The trough is shown as supported on legs 4, but may be otherwise supported without departing from the spirit of my invention. A trough-shaped float 5 is arranged in the trough. This float preferably will consist of celluloid or similar light material impervious to water. The central tubular hub 6 of the float has secured to its upper end a metal plate 7, provided with a central perforation, through which the upwardly-extended portion of a plumb-bob rod 8 extends. This rod 8 has an enlarged portion 9, seated loosely in an opening in the plate 3, and the bob 10 is removably connected to the lower end of the rod. Obviously by the cone-shaped enlarged portion 9 the plumb-bob may be easily swung in any direction.

At one side of the float is secured an eyepiece 11, and at the opposite side is secured a diaphragm 12, having the usual crossed wires, as clearly shown in Fig. 4. The base portions of these parts 11 and 12 may be seated or countersunk in the wall of the float or may be placed on the top thereof, as shown, and these base portions will form covers for recesses 13, in which shot or similar material may be placed for finely adjusting the balancing of the float. The top of the outer wall of the float is graduated suitably, as indicated in Fig. 2.

I provide a means for preventing a rotary movement of the float when the sights are adjusted in the desired direction. This means consists of a pin 14, extended from the float and adapted to engage with a weight 15, movable on the wall of the trough 1. As here shown, this weight 15 has a vertical slot formed in it, so as to permit of the movements of the float in seeking its level, but, as before stated, will prevent rotary movement.

The operation of the device is quite obvious—that is, the float is to be turned to bring the parts 11 and 12 in the proper direction and then after the float shall have become quiet and on its proper level the sight may be taken.

Having thus described my invention, I claim as new and desire to secure by Letters Patent—

1. A leveling instrument comprising a trough for containing liquid, a float arranged in the trough, adjustable means for holding the float from turning axially, an eyepiece carried on one side of the float, and a diaphragm carried on the opposite side of the float, substantially as specified.

2. A leveling instrument comprising a circular trough, a circular float arranged in the trough, sight devices carried on the float, and adjustable means for holding the float from rotary movement, substantially as specified.

3. A leveling instrument comprising a circular trough having a tubular upwardly-extended circular portion, a plate secured to the upper end of said circular portion, a plumb-bob rod supported by said plate and having a portion extended above the plate, a float arranged in the trough and having an opening at its center through which said upwardly-extended end of the rod passes loosely, and sight devices on opposite sides of said float, substantially as specified.

4. A leveling instrument comprising a trough, a float arranged therein and having recesses for receiving shot or the like, and sight devices forming covers for said recesses, substantially as specified.

5. A leveling instrument comprising a circular trough, a float arranged in said trough, sight devices on said float, a pin extended from the float, and a weight movable around the trough and with which said pin engages to hold the float from rotary movement, substantially as specified.

In testimony whereof I have signed my name to this specification in the presence of two subscribing witnesses.

GEORGE H. PRIER.

Witnesses:
JNO. M. RITTER,
C. R. FERGUSON.